T. ZWOLINSKI.
ATOMIZER.
APPLICATION FILED MAR. 1, 1913. RENEWED AUG. 10, 1917.
1,259,582.
Patented Mar. 19, 1918.
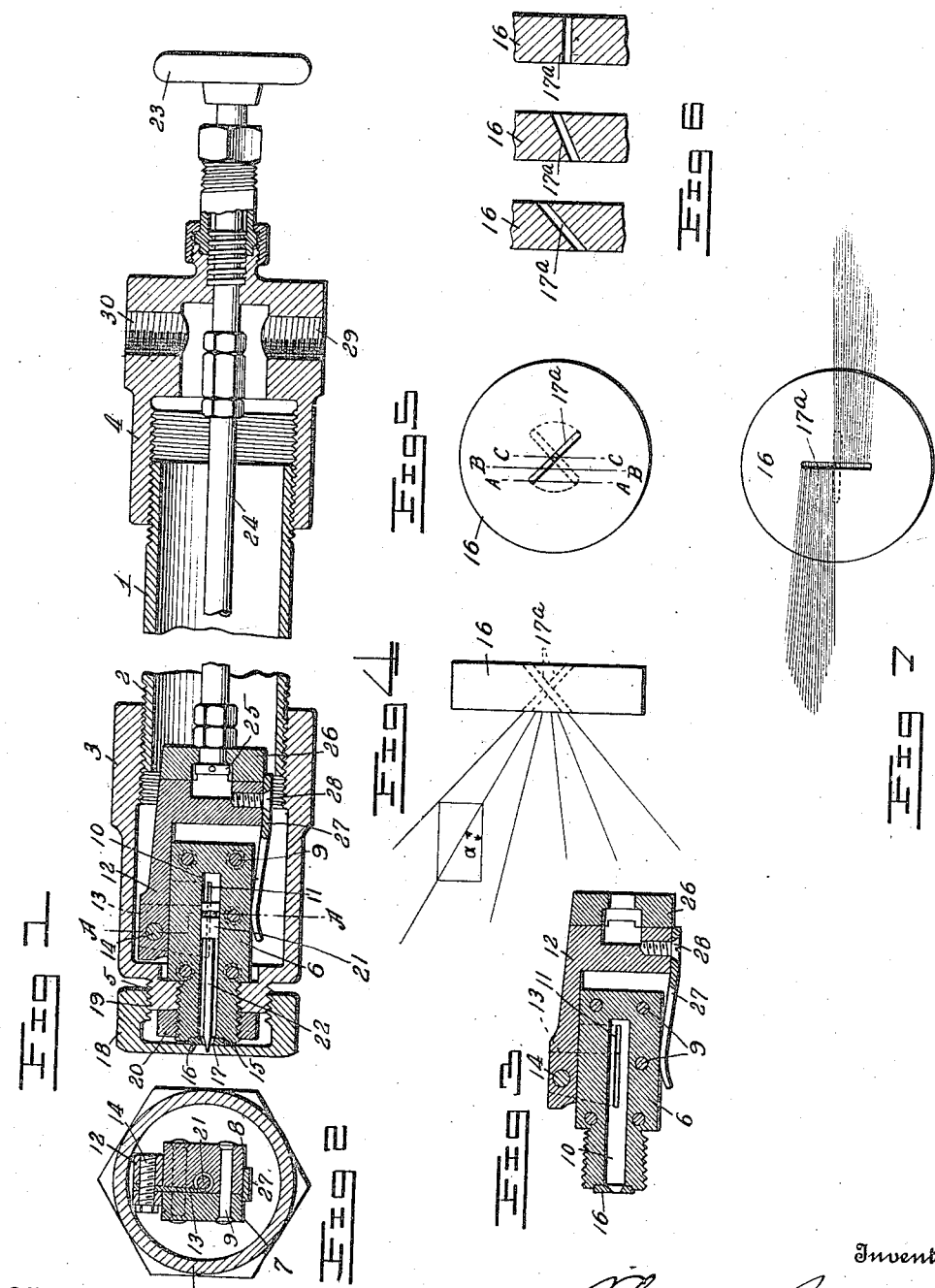
Witnesses
H. A. Robinett
J. Austin Stone
Inventor
Thaddeus Zwolinski,
By Clark, Prentis & Clark,
Attorneys.

UNITED STATES PATENT OFFICE.

THADDEUS ZWOLINSKI, OF SAN FRANCISCO, CALIFORNIA.

ATOMIZER.

1,259,582.　　　　　Specification of Letters Patent.　　Patented Mar. 19, 1918.

Application filed March 1, 1913, Serial No. 751,574.　Renewed August 10, 1917.　Serial No. 185,629.

*To all whom it may concern:*

Be it known that I, THADDEUS ZWOLINSKI, a subject of the Czar of Russia, residing in San Francisco, in the county of San Francisco and State of California, have invented new and useful Improvements in Atomizers, of which the following is a specification.

This invention relates particularly to improvements in atomizers used for spraying fuel oil, whereby the oil is atomized and injected into a combustion chamber in the form of spray.

One of the features of this invention is the use of novel means to bring about a whirling motion in the liquid used.

Another feature is the novel diaphragm and the discharge orifices therein which give a flat flame, a feature much desired in some types of boilers. A further feature is the elongated entry port together with a cleaning member and valve thereunto appertaining.

My invention is based on the principle of atomizing a liquid by submitting it to combined hydrostatic pressure and centrifugal force. So, if an inclosed cylinder with a round outlet hole in the center of one end is used, and liquid under pressure is conducted to the cylinder through an inlet opening or slot tangential to said cylinder, then a portion of the pressure will be converted into the rotation of the liquid in the cylinder and the remainder will remain as hydrostatic pressure.

If the outlet hole be closed then no revolution of liquid will occur, and the pressure in the cylinder will be the same as that in the tangential inlet opening or slot. If the outlet hole is too large, no hydrostatic pressure will be left in the cylinder, all being transformed into a rotary movement inside of the cylinder, with the result that as soon as any part of the liquid leaves the cylinder, it will follow a line tangent to the cylinder, provided the outlet opening is of such form as not to destroy the centrifugal power.

If the inlet pipe is not tangent to the inner wall of the cylinder, but its center line intersected the center line of the cylinder, there is no rotation of the liquid. Hence, by properly combining the pressure with the diameters of the inlet and outlet openings, every particle of liquid leaving the outlet hole may be submitted to two forces—one due to hydrostatic pressure and directed along the center line of the cylinder and outlet opening, and the other the centrifugal force, which is tangent to the circle which the liquid describes around the said center line; and because the centrifugal power is a function of radius of rotation, then the different parts of a portion of the liquid are subject to different forces wherefrom results the atomization desired.

Applying the above stated theory, my invention will be understood by reference to the accompanying drawings in which—

Figure 1 is a longitudinal sectional view of the complete structure.

Fig. 2 is a view of a section taken on lines A—A of Fig. 1.

Fig. 3 is a view of a modification of the body block shown in Fig. 1 without the cleaning needle.

Fig. 4 is a side view of a helically slotted diaphragm, in which the slots are shown in outline.

Fig. 5 is a plan view of the same.

Fig. 6 shows views of the helical slot taken on the line A—A, B—B, and C—C, of Fig. 5, respectively.

Fig. 7 is a plan view of Fig. 5 showing the lines of direction taken by the fuel on leaving the atomizer diaphragm.

Like numerals refer to like parts in the figures. Referring to the drawings, the numeral 1 designates a tube or casing forming the body of the structure. Secured to the threaded ends 2 of this casing are the heads 3 and 4. Within the tube 1 and fastened to the head 3 by interior screw threads 5 is a metallic body block 6, which is made of two pieces 7 and 8 securely fastened together by screws or rivets 9. Said body block 6 has a cylindrical chamber or bore 10, open at one end, and an elongated port 11 in the wall tangent to said bore and connecting the bore with the space within the casing and outside of the body block. Mounted to move reciprocally on the exterior of the body block 6 is a slide 12 arranged to move over the exterior opening of the port 11 and open or close it. A cleaning member 13 is fastened to the slide 12 by a screw 14 and projects from it into the elongated port 11, moving with the slide 12 and acting as a cleaner for any superfluous matter. The edge of the slide 12 opens and closes the port 11 while the cleaning member 13 is removing all carbon or other possible obstacles from the surface of the port. At the end of the body block 6 is a depression 15 adapted to hold therein a removable insert or diaphragm 16 concentric with the bore 10, said diaphragm having the orifice 17 through which the fuel escapes from the atomizer. A nut 18 threaded at 19 to head 3 holds the diaphragm in its seat, and a lock nut 20 on block 6 enables the adjustment of parts 3 and 6, in respect to each other, to be made secure.

Fitting within the chamber or bore 10 and adapted to slide therein is a cylinder 21 wearing on its forward end a needle 22 for cleaning the discharge opening of the chamber and the orifice 17 of diagram insert 16. This cylinder 21 may be actuated by any means, but as shown in Fig. 1, it is connected to the inner end of the cleaning member 13 and arranged to move in conjunction therewith, the valve slide 12 and port cleaning member 13 being in their extreme forward position, the port being closed, and the diaphragm cleaning needle 22 extending through the insert orifice.

At the opposite end of the casing 1 and without the head 4 is a handle 23 connected to the rod 24 which passes through the head 4 and extends through the casing 1, terminating at the swivel socket connection 25 in block 26. One end of the slide 12 is connected to this block 26 and on the side of the block 26 opposite to that having the slide connection, is fastened a spring 27, by means of screw 28, which spring 27 is adapted to hold the slide 12 upon the outer ground surface of the body block 6 and over the exterior opening of port 11. The head 14 is provided with two threaded openings for inlet pipes, one 29 for oil under pressure and the other 30 for steam or air, for blowing off the remaining oil when the burner is to remain idle in a heated furnace.

The use of an insert diaphragm shown in Fig. 4 will give a flat flame in the form of a fan. Such a flame is often desirable when the burner has to serve furnaces with rectangular sections. For this purpose, instead of a conical orifice in the center of the diaphragm (Fig. 1) a helical slot 17$^a$ would be cut in the same, the center of the helix being in the center of the diaphragm and the pitch of the helix being proportional to the cotangent of the angle between two velocities of the liquid, one velocity due to static pressure within the tube 1 and the other due to the centrifugal power developed by the whirl of liquid resultant of the tangential port 11, (see Fig. 4).

Fig. 5 shows a plan view of the same insert as shown in Fig. 4. In Fig. 6 are shown views of sections of the insert shown in Figs. 4 and 5, taken on the lines A—A, B—B and C—C of Fig. 5, respectively. Fig. 7 is a view of the insert similar to that shown in Fig. 5, but showing the lines of direction taken by the fuel after leaving the helical atomizer outlet orifice.

The operation of the burner is as follows: Oil under pressure is admitted through the opening 29 into the head 4, casing 1 and head 3. When the handle 23 is actuated the slide 12 is withdrawn along the ground surface of body block 6, uncovering the tangential port 11. The oil rushes through this port 11 into the chamber 10 and passes with a whirling motion out of the chamber 10 through the diaphragm opening 17 and into the combustion chamber. A reverse movement of the slide 12 will close the port 11, the cleaning member 13 and needle 22 cleaning the port and diaphragm openings respectively, removing all carbon or obstacles of any kind. Upon the oil being turned off from without the oil opening 29, steam or air may be turned into the casing 1 through opening 30 and any remaining oil may be blown out of the atomizer.

What I claim is:—

1. A liquid atomizer comprising a body block formed with a delivery chamber and a lateral longitudinally elongated inlet port, a reciprocable slide engaging said body block and controlling said port, and a cleaning member carried by said slide and extending into said port.

2. A liquid atomizer comprising a body block formed with a delivery chamber and a lateral longitudinally elongated inlet port tangentially disposed with relation thereto, a reciprocable slide engaging said body block and controlling said port, and a cleaning member carried by said slide and extending into said port.

3. A liquid atomizer comprising a body block formed with a delivery chamber and a lateral longitudinally elongated inlet port, said chamber having a forward discharge orifice, a reciprocable slide engaging said body block and controlling said port, a cleaning member carried by said slide and extending through said port, and a cleaning needle for said discharge orifice actuated by said cleaning member.

4. A liquid atomizer comprising a two part body block formed with a delivery chamber and a lateral longitudinally elongated inlet port, said chamber having a forward discharge orifice, a reciprocable slide engaging said body block and controlling said port, a cleaning member carried by said slide and extending through said port, and a cleaning needle for said discharge orifice actuated by said cleaning member.

5. A liquid atomizer comprising a body block formed with a delivery chamber and a lateral longitudinally elongated inlet port, tangentially disposed with relation thereto, said chamber having a forward discharge orifice, a reciprocable slide engaging said body block and controlling said port, a spring engaging said body block and the said reciprocable slide to hold them in constant engagement, a cleaning member carried by said slide and extending through said port, and a cleaning needle for said discharge orifice actuated by said cleaning member.

6. In a liquid atomizer, a casing, a body block movably attached to one end of said casing, a nut to adjustably lock said casing and body block in relation to each other, said body block formed with a delivery chamber and a lateral longitudinally elongated inlet port, tangentially disposed with relation thereto, said chamber having a forward discharge orifice, a reciprocable slide engaging said body block and controlling said port, a spring engaging said body block and the said reciprocable slide to hold them in constant engagement, and a cleaning member carried by said slide and extending through said port, and a cleaning needle for said discharge orifice actuated by said cleaning member.

7. In a liquid atomizer a casing, a body block within said casing and affixed thereto and provided with a chamber having a forward discharge outlet, a helically slotted block insert removably secured to the outlet end of said body block, in juxtaposition to said outlet and concentric thereto, and a nut for holding said block insert in position, the opening of said block insert extending across the center of its face.

8. A liquid atomizer having at its discharge end a short delivery channel of substantially uniform diameter in the form of a twist drill.

9. A liquid atomizer having a bore provided with a tangential inlet opening for supplying fuel to said bore and a discharge outlet block arranged axially to said bore and provided with a helically formed discharge channel, the direction of said helical channel being substantially that given the fuel by the tangential opening to the bore.

10. A liquid atomizer having a bore provided with an inlet opening for supplying fuel to said bore and a discharge outlet block arranged axially to said bore and provided with a helically formed discharge channel, said helix including a substantially straight opening through said block in a line with the axis of said bore.

In testimony whereof I have hereunto set my hand in presence of two subscribing witnesses.

THADDEUS ZWOLINSKI.

Witnesses:
  H. V. WHEELER,
  E. P. LEWANDOWSKI.

Copies of this patent may be obtained for five cents each, by addressing the "Commissioner of Patents, Washington, D. C."